(12) United States Patent
Song

(10) Patent No.: US 7,238,752 B2
(45) Date of Patent: Jul. 3, 2007

(54) HIGH MOLECULAR WEIGHT CATIONIC POLYMERS OBTAINED BY POST-POLYMERIZATION CROSSLINKING REACTION

(75) Inventor: Zhiqiang Song, Newton, CT (US)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 149 days.

(21) Appl. No.: 11/190,573

(22) Filed: Jul. 27, 2005

(65) Prior Publication Data

US 2005/0261419 A1    Nov. 24, 2005

Related U.S. Application Data

(62) Division of application No. 10/639,105, filed on Aug. 12, 2003.

(60) Provisional application No. 60/473,735, filed on May 28, 2003, provisional application No. 60/403,844, filed on Aug. 15, 2002.

(51) Int. Cl.
 C08F 36/02 (2006.01)
 C08F 214/02 (2006.01)

(52) U.S. Cl. .............. 525/344; 524/555; 524/567; 525/331.9; 526/295; 526/336

(58) Field of Classification Search ............ 524/555, 524/567; 525/331.9, 344; 526/295, 336
See application file for complete search history.

(56) References Cited

U.S. PATENT DOCUMENTS

| | | | |
|---|---|---|---|
| 3,168,500 A | 2/1965 | Suen et al. | 260/80.3 |
| 3,544,318 A | 12/1970 | Boothe et al. | 96/1.5 |
| 3,968,037 A | 7/1976 | Morgan et al. | 210/47 |
| 4,222,921 A | 9/1980 | Van Eenam | 260/29.6 |
| 4,439,580 A | 3/1984 | Schaper | 524/801 |
| 4,742,134 A | 5/1988 | Butler et al. | 526/238 |
| 5,248,744 A | 9/1993 | Cramm et al. | 526/73 |
| 5,422,408 A | 6/1995 | Cramm et al. | 526/219.2 |
| 5,653,886 A | 8/1997 | Kerr et al. | 210/727 |
| 5,879,564 A | 3/1999 | Farinato | 210/734 |
| 5,973,108 A | 10/1999 | Eyrisch et al. | 528/489 |
| 5,989,392 A | 11/1999 | Tang et al. | 162/191 |
| 6,117,938 A | 9/2000 | Farinato et al. | 524/801 |
| 6,323,306 B1 | 11/2001 | Song et al. | 528/342 |

FOREIGN PATENT DOCUMENTS

| | | |
|---|---|---|
| DE | 158783 | 2/1983 |
| EP | 0208945 | 1/1987 |
| EP | 0264710 | 4/1988 |
| EP | 0308109 | 3/1989 |
| EP | 0600592 | 6/1994 |
| EP | 0878487 | 11/1998 |
| GB | 2046279 | 11/1980 |

OTHER PUBLICATIONS

W. Jaeger et al., J. Macromol. Sci.-Chem., A21(5), pp. 593-614, (1984).
L. Ghimici et al., "Interactions of the Low-Molecular Weight Salts with Cationic Polyelectrolytes", Journal of Polymer Science: Part B, vol. 35, pp. 2571-2581, (1997).
L. Gu et al., Journal of Applied Polymer Science, vol. 74, pp. 1412-1416, (1999).

*Primary Examiner*—Helen L. Pezzuto
(74) *Attorney, Agent, or Firm*—Shiela A. Loggins

(57) ABSTRACT

The molecular weight of cationic polymers, such as diallyl-dialkyl ammonium chloride, can be increased by controlled addition of a water-soluble radical initiator at an elevated reaction temperature with agitation to prepare high molecular weight, crosslinked, water-soluble cationic polymers.

15 Claims, No Drawings

HIGH MOLECULAR WEIGHT CATIONIC POLYMERS OBTAINED BY POST-POLYMERIZATION CROSSLINKING REACTION

The application is a divisional application of Ser. No. 10/639,105, filed on Aug. 12, 2003 which claims the benefit of Provisional Application No. 60/473,735, filed on May 28, 2003 and Provisional Application No. 60/403,844, filed on Aug. 15, 2002.

BACKGROUND OF THE INVENTION

This invention is directed to preparation of high molecular weight crosslinked, water-soluble cationic polymers. Cationic polymers have been used extensively in water treatment, papermaking, mineral processing, petroleum recovery, fabrics, cosmetics and pharmaceuticals. Among the most important and extensively used cationic polymers are the quaternary ammonium polymers of diallyldialkyl ammonium compounds. It has been shown that the higher the molecular weight (MW) of the resulting cationic polymer, the more effective the polymer is as a flocculating agent.

Polymerization with added inorganic salts has been used to achieve high molecular weights. Polymerization of diallyldialkyl ammonium monomers is typically carried out in aqueous solution using a free radical initiator. Persulfate is commonly used as initiator for polymerization of the most commercially important diallyldialkyl ammonium monomer, diallydimethyl ammonium chloride (DADMAC).

U.S. Pat. No. 4,222,921 first discovered that the use of a diallylamine salt other than hydrohalide markedly speeds up the polymerization rate using ammonium persulfate (APS) as initiator. The conversion of monomer to polymer was substantially greater when the diallylamine salt polymerized was a salt of a strong acid (e.g., sulfuric acid) other than hydrohalide acids (e.g., hydrochloride acid). It was speculated that the halide ion acted as a chain transfer agent and a chain terminator.

Jaeger et al. (Macromol. Sci. Chem., A21(5):593, 1984) reported that persulfate could oxidize the chloride ion to produce chlorine radical which then terminated polymerization and decreased molecular weight. They obtained relatively high molecular weight poly-DADMAC using azo initiator instead of persulfate initiator.

U.S. Pat. No. 4,742,134 discloses that increased polymerization rate and molecular weight can be obtained using fluoride salts with persulfate initiator. Halide salts other than fluoride (e.g. NaCl) did not accelerate polymerization for increased molecular weight.

U.S. Pat. No. 5,248,744 discloses a method for making high molecular weight poly-DADMAC with an azo initiator.

U.S. Pat. No. 5,422,408 gave data of reduction potentials to show that persulfate is strong enough to oxidize chloride ions and bromide ions but not fluoride ions. Therefore, addition of chloride salts (e.g. NaCl) or bromide salts would not give increased molecular weight for polymerization of DADMAC using persulfate initiator. The reference disclosed a method to prepare polyDADMAC with increased molecular weight using an azo initiator in combination with added Inorganic salts including NaCl salt.

U.S. Pat. No. 4,439,580 demonstrated that use of ammonium persulfate initiator with added NaCl salt in inverse emulsion polymerization also gave high molecular weight polyDADMAC. The narrow pH range (8.0 to 10.5) and added salts used in the inverse (water-in-oil) emulsion polymerization were claimed to be critical elements for the success of this invention.

U.S. Pat. No. 3,544,318 teaches that branched polyDADMAC works better than linear for electroconductive paper because the branched polymer imparts superior barrier properties to the electroconductive paper substrate, preventing solvent from diffusing into the paper.

U.S. Pat. No. 3,968,037 showed that cationic polymers obtained made by inverse (water-in-oil) emulsion polymerization with crosslinking and branching agents had surprisingly high effectiveness as flocculants and for the treatment of activated sewage sludge. The inventors used polyolefinic unsaturated compounds, such as tri- and tetra-allyl ammonium salts, or methylenebisacrylamide (MBA), as the crosslinkling agents. They found that only ineffective products were obtained from solution polymerization containing a crosslinking agent.

Published European Pat. No. 264,710, however, claimed that highly branched water-soluble polyDADMAC made from solution polymerization also worked better as flocculants or defoaming agents for breaking oil-in-water emulsions. The branched polyDADMAC were made by adding 0.1 to 3.0 mole % of crosslinking comonomer such as methyltriallyl ammonium chloride (MTAAC) or triallylamine hydrochloride (TAAHCl) during progressive polymerization of DADMAC after monomer conversion had achieved at least 25% to 90%. A completely gelled product was obtained when the MTAAC was added all at once in the beginning.

U.S. Pat. No. 5,653,886 discloses the use of crosslinked DADMAC polymers as coagulants in suspensions of inorganic solids for mineral refuse slurry. The preferred high molecular weight crosslinked polyDADMAC for the application is prepared by copolymerization of DADMAC with acrylamide and triallylamine.

U.S. Pat. No. 5,989,382 uses a multifunctional (triallylamine) to make high molecular weight cross-linked polyDADMAC, which can be used for pitch control in papermaking.

In studying interaction of cationic polyelectrolytes with counter anions, Ghimici et al (Journal of Polymer Science: Part B, Vol. 35, page 2571, 1997) found that the cationic polyelectrolyte sample with more branching or crosslinking had stronger binding with anionic counter ions. They think that branching of the polycations creates regions with higher numbers of charged groups even at high dilution and consequently an increased number of counterions are associated to them. Similar explanation may be given to account for improved performance of branched or crosslinked polyDADMAC in coagulation and flocculation applications U.S. Pat. No. 6,323,306 discloses a process for the preparation of a high molecular weight cationic polymer by crosslinking quaternary ammonium cationic base polymers with crosslinking agents capable of reacting with the amino functional groups of the cationic base polymer.

Peroxide compounds have been used to crosslink water-insoluble hydrocarbon polymers, without polar side-groups, in organic solvents or in melts. In 1914, it was discovered that dibenzoyl peroxide crosslinks rubber. The use of the more effective dialkyl peroxides to crosslink polymers started shortly after 1950. The crosslink is believed to be attained through free radicals formed by homolytic decomposition of the peroxide. The decomposition of peroxide produces radicals, which can abstract hydrogen from polymer chains. Coupling of the polymeric radicals leads to crosslinks for vulcanization. [Kirk-Othmer Concise Encydopedia of Chemical Technology, published by John Wiley & Sons, Inc., 1985, page 1028]. However, the radical crosslinking is effective only for limited thermoplastic polymers. The radicals formed on polymer chains can lead to degradation as well as crosslinking. Polymer structure among other things decides whether crosslinking or degradation is likely to occur. It is known that treatment with peroxide in melts will cause polyethylene to crosslink but polypropylene to degrade. Radical crosslinking is not effective for butyl rubber or the like. An oil-soluble organic peroxide is generally used for radical crosslinking of hydrophobic water-insoluble polymers. A few water-soluble polymers containing polar side-groups have been found to be crosslinkable by water-soluble radical initiators.

U.S. Pat. No. 3,168,500 discloses a method for making water-insoluble acrylamide polymers by crosslinking a water-soluble acrylamide polymer in the presence of a radical initiator. Peroxo compounds, such as potassium persulfate, hydrogen peroxide, or t-butyl hydroperoxide with or without a reducing agent when added in large quantities, usually greater than 10% based on the amount of the polymer solids, will gel polyacrylamide or copolyacrylamide solutions of great than 1% concentration. The initiator and the polymer are premixed and then the system is heated to a desired temperature until the polymer is converted into a water-insoluble gel. No reaction occurs with less than the minimum amount of about 5 to 10% of the initiator. The pH of the system during the process is not critical. The water-insoluble polymers of acrylamide can be used for the preparation of adhesives, soil stabilization or for treating paper, textiles, leather and the like. The polymers of acrylamide are non-ionic polymers or anionic copolymers. The patent does not describe the method for making water-soluble crosslinked polymers. It was demonstrated with examples that peroxides, such as hydrogen peroxide and t-butyl hydrogen peroxide, can effect crosslinking as well as persulfate compounds.

Published European Patent 208,945 discloses a method for making water absorbent acrylic polymers crosslinked by a peroxide radical initiator. Water-soluble acrylic add polymers are premixed with a water-soluble peroxide radical initiator and then heated and dried to form water-insoluble crosslinked polymers. Initiator levels as low as 0.01 wt % based on polymer solids is claimed to effect the crosslinking, although 0.5% to 5% of initiator is normally used. However, it is noticed that very high temperatures, usually higher than 120° C., are used. At such high reaction temperatures, the added initiator may not be the only contribution to the achieved crosslinking. U.S. Pat. No. 3,168,500 reports that at temperatures of over about 120° C., polymers of acrylamide tend to crosslink by themselves without a radical initiator. The self-crosslinking of polyacrylamide is believed to involve a different reaction mechanism, reaction with other units at the amide group to evolve ammonia. In addition, the reaction system for making water absorbent polymers is an open system. Crosslinking occurs at high polymer solids (50 to 90%) when most of the water in the initial mixture has been evaporated, though the presence of water is also critical for effective crosslinking. The acrylic polymers used in European Patent 208,945 for crosslinking contain at least 70% by weight of acrylic acid monomeric units and 60 to 90% of carboxyl groups from acrylic acid in the form of an alkali metal salt. The patent is related to making water-insoluble anionic polyacrylates used as super-absorbents for water.

Published European Patent 600,592 discloses a method for preparing low molecular weight, crosslinked, water-soluble anionic polymers by radical crosslinking. The chain combination reaction is carried out in the presence of water-soluble radical initiators such as those used in U.S. Pat. No. 3,168,500 for nonionic acrylamide polymers. However, while U.S. Pat. No.3,168,500 reported that the pH of the system during the process is not critical, European patent 600,592 found that the pH had a dramatic effect on the chain combination reaction. An optimal pH of 5.0 was found for anionic acrylate polymers in European Patent 600,592. Also, while U.S. Pat. No. 3,168,500 reported that no reaction would occur with less than about 5% of the initiator for polyacrylamide, EP 600,592 used as little as 2% of sodium persulfate to increase the molecular weight of polyacrylates. EP 600,592 teaches that the chain combination reaction for the acrylate polymer can be effected even in the presence of significant amount of polymerizable monomer. On the other hand, U.S. Pat. No. 3,168,500 states that the starting acrylamide polymer should be "substantially free" or have no more than 1–2% of monomer. In EP 600,592, the starting acrylate polymer solution was heated to a reaction temperature of 90° C. The desired amount of radical initiator was then added over a relatively short period time (15 to 30 minutes). The reaction temperature was maintained for an additional time, usually less than 2 hours, to use up the initiator added for crosslinking. Reaction temperature, pH, amount of added initiator, and reaction time mainly control the extent of crosslinking and molecular weight increase after addition of the initiator. Initiator feed time is not used to control extent of crosslinking. The patent is related to making low molecular weight crosslinked polyacrylates for detergent and cleaning applications.

There is evidence that strong cationic polyelectrolytes behave differently from weak polycations in responding to binding polyvalent count ions (Ghimici et al, Journal of Polymer Science: Part B, Vol. 35, page 2571, 1997), which can be present in systems using ionic water-soluble radical initiators such as salts of persulfuric acid, perphosphonic acid and percarbonic acid. Furthermore, crosslinking between the strong electrolyte polymeric radicals can be limited due to electrostatic repulsion. Ma and Zhu (Colloid Polym. Sci, 277:115–122 (1999) have demonstrated that polyDADMAC cannot undergo radical crosslinking by irradiation because the cationic charges repel each other. On the other hand, nonionic polyacrylamide can be readily crosslinked by irradiation. Difficulty in crosslinking polyDADMAC with organic peroxides was reported by Gu et al. (Journal of Applied Polymer Science, Volume 74, page 1412, (1999)). Treating polyDADMAC with a dialkyl peroxide in the melt (140 to 180° C.) only led to degradation of the polymer as evidenced by a decrease in intrinsic viscosity.

SUMMARY OF THE INVENTION

The above review on polyDADMAC shows that there has been a need for high molecular weight and branched water-soluble cationic polymers. The invention herein is the use of a post-crosslinking technology. The technology involves crosslinking a water-soluble cationic polymer by controlled addition of a water-soluble radical initiator at a suitable reaction temperature. The present inventor discovered a novel way to overcome electrostatic repulsion forces for crosslinking polyDADMAC in solution through a radical mechanism.

Thus, the present invention relates to crosslinking water-soluble cationic polymer of diallyldimethylammonium chloride (DADMAC) that are strong cationic electrolyte polymers. Monomeric DADMAC, in spite of containing two double bonds, undergoes cyclopolymerization to form mostly linear, water-soluble polymers with repeat units of 5-membered pyrrolidinium heterocyclic rings. Thus, polymers of DADMAC are very different in structure from acrylate and acrylamide polymers. Indeed, the present inventors have discovered some unique properties of DADMAC polymers in crosslinking by radical initiators. First, not all radical initiators suitable for crosslinking acrylate and acrylamide polymers are effective for crosslinking DADMAC polymers.

The present inventor found that persulfate compounds, such as ammonium, sodium or potassium persulfate, are the most effective for crosslinking DADMAC polymers. Other water-soluble peroxide compounds such as hydrogen peroxide and tert.-butyl hydroperoxide appeared to be much less effective for crosslinking DADMAC polymers. Hydrogen peroxide caused more degradation than crosslinking of DADMAC polymers. Tert.-butyl hydroperoxide gave little crosslinking. The fact that persulfate compounds work the most effectively may result from the fact that DADMAC polymers are cationic and persulfate is a difunctional anionic species before decomposition. The difunctional anionic persulfate may bring the two DADMAC polymer chains together through ionic bonding before decomposing to form radicals for crosslinking through covalent bonding.

The present inventor found that crosslinking of DADMAC polymers is hindered by residual monomer. Residual DADMAC monomer not only competes for initiator for use but also causes the polymer to degrade. Polymers of DADMAC can be crosslinked by persulfate compounds only when the residual monomer is reduced to sufficiently low levels, which depend on the polymer concentration used for the post crosslinking.

The present inventor also discovered that for polymers of DADMAC, feeding the same amount of the initiator over different lengths of time results in different viscosity increases or extents of crosslinking. Thus, the extent of crosslinking can be well controlled by feed rate and the feed time of the initiator.

There is a need for high molecular weight, crosslinked, water-soluble cationic polymers. Therefore, one objective of this invention is to provide a novel method for making high-molecular-weight crosslinked water-soluble polymers of diallyldialkyl ammonium chloride without addition of a polyolefinic crosslinker.

It is another objective of this invention to provide a crosslinked polymer of DADMAC with a structure different from that of crosslinked polymers made by addition of a polyolefinic crosslinker. While the crosslinked polymers made using a polyolefinic crosslinker have the crosslinker bridged between two connected polymer chains, the crosslinked polymers of the present invention do not contain such crosslinker bridges and therefore are believed to have shorter crosslinking bridges with polymer chains simply connecting at some point on their backbones.

In order to prepare DADMAC polymers of high molecular weight by solution radical polymerization, it is usually necessary to use solutions with high concentrations of the cationic monomer. During the course of the polymerization, the viscosity of the reaction medium increases to very high levels. Poor mixing and heat transfer in these highly viscous solutions limit the obtainable molecular weight of the cationic polymers. It is therefore another objective of this invention to provide a process which can overcome the above problem to obtain high molecular weight by post-crosslinking at low polymer concentrations. The low polymer concentration used will not give high in-process viscosity that can limit implementation in commercial production.

It is also another objective of this invention to provide a process for making cationic polymers with controlled degree of crosslinking or branching and therefore controlled molecular weight. The molecular weight of the cationic polymers has been controlled by varying the polymerization conditions when making cationic polymers through radical polymerization. Such methods are inflexible. The process of the present invention has greater adaptability by providing a means to control the molecular weight by stopping the feed of persulfate once a desired molecular weight is achieved.

The high molecular weight, crosslinked, water-soluble cationic polymers of the present invention can be used as coagulation or flocculation agents in a number of industrial processes, which include, but are not limited to, potable and wastewater clarification; oil water separation; sludge dewatering; mineral processing, including coagulation of fines and clarification of process water; papermaking as a retention aid and as fixative for pitch and stickies deposit control. The crosslinked cationic polymers of the present invention may also be applied to other well-known end uses for cationic polymers. Such end uses include, but are not limited to, textile dye binders and dye thickeners; personal care applications, including shampoos, hair and skin conditioners, soaps and lotions; conductive coatings for paper, and the like.

DETAILED DESCRIPTION OF THE INVENTION

Accordingly, the present invention is directed to a novel method to make high molecular weight, crosslinked, water-soluble cationic polymers. The method consists of crosslinking a cationic base polymer by controlled addition of a suitable radical initiator.

More particularly the present invention is directed to a method for the preparation of an aqueous cationic polymer solution, said method comprising:

(a) polymerizing substantially all of a monomer component having at least one monomer having a cationic functional group by reaction initiated from a free radical initiator to form a base cationic polymer solution;

(b) contacting the base cationic polymer solution with additional free radical initiator to cause multiple cationic polymer groups to form interconnecting bonds so that said base cationic polymer solution forms an aqueous solution containing a multi-crosslinked cationic polymer having a higher molecular weight than the base cationic polymer.

The base polymers for crosslinking to prepare the high molecular weight crosslinked water-soluble cationic polymers of the present invention can be produced by any known method. The cationic base polymers can be prepared by radical polymerization of a suitable cationic monomer in aqueous solution. Examples of the cationic monomers useful for preparing the cationic base polymers of this invention include diallyldialkylammonium compounds, acryloxyethyltrimethylammonium chloride, methacryloxyethyltrimethylammonium chloride, vinylbenzyltrimethylammonium chloride, and 3-acrylamido-3methylbutyltrimethylammonium chloride. The preferred cationic base polymers are those polymers made from polymerization of diallyldialkylammonium compounds, which may be represented by the following formula:

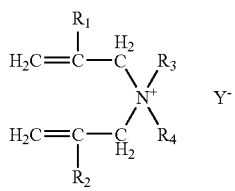

where $R_1$ and $R_2$ are independently of one another hydrogen or $C_1$–$C_4$ alkyl; $R_3$ and $R_4$ are, independently, hydrogen or an alkyl, hydroxyalkyl, carboxyalky, carboxyamidalkyl or alkoxyalkyl groups having from 1 to 18 carbon atoms; and $Y^-$ represents an anion. Examples of the preferred diallydialkylammonium monomer include diallyldimethylammonium chloride (DADMAC), diallyldimethylammonium bromide, diallydimethylammonlum sulfate, diallydimethylammonium phosphate, dimethyallydimethyammonium chloride, diethylallyldimethylammonium chloride, diallyldi(beta-hydroxyethyl)ammonium chloride, diallyldi(beta-ethoxyethyl)ammonium chloride and dialyldiethylammonium chloride. The most preferred cationic monomer for the catonic base polymer is a poly-DADMAC.

The base polymers for crosslinking to prepare the high molecular weight crosslinked water-soluble cationic polymers of the present invention can also be any commercially available water-soluble cationic polymers, especially homopolymers or copolymers of diallydiaikylammonlum halide. Examples of commercially available homopolymers or copolymers of diallyldialkylammonium halide are those sold under the trade names of Agefloc and Agequat by Ciba Specialty Chemicals.

Suitable cationic base polymers can also be copolymers of cationic monomers and other copolymerizable monomers. Examples of suitable monomers copolymerizable with cationic monomers include, but are not limited to, acrylamide, methacrylamide, N,N-dimethyl acrylamide, acrylic acid, methacrylic acid, vinylsulfonic acid, vinylpyrrolidone, hydroxyethyl acrylate, and the like. Sulfur dioxide can also be used to copolymerize with DADMAC.

Polymerization of the cationic monomer for the cationic base polymer can be carried out by aqueous solution polymerization, water-in-oil inverse emulsion polymerization or dispersion polymerization using a suitable free radical initiator. Examples of suitable initiators include persulfates such as ammonium persulfate (APS); peroxides such as hydrogen peroxide, t-butyl hydroperoxide, and t-butyl peroxy pivalate, azo initiators such as 2,2'-azobis(2-amidinopropane) dihydrochloride, 4,4'-azobis-4-cyanovaleric acid and 2,2'-azobisisobutyronitrile; and redox initiator systems such as t-butyl hydroperoxide/Fe(II) and ammonium persulfate/bisulfate. Aqueous solution polymerization using ammonium persulfate (APS) is the preferred method for preparing the base cationic polymer of the preferred monomer DADMAC.

The amount of the free radical initiator used in the polymerization process depends on total monomer concentration and the type of monomers used and may range from about 0.2 to about 5.0 wt % of the total monomer charge to achieve more than 99% of total monomer conversion.

It is preferred to carry out the polymerization in the absence of oxygen. Oxygen can be removed from the reaction medium by applying vacuum with agitation or by purging with an inert gas such as nitrogen and argon. The polymerization can then be conducted under a blanket of the inert gas.

Diallyamine monomers such as DADMAC, although containing two unsaturated C=C double bonds, are well known to form linear polymers with a free radical initiator through cyclopolymerization. The linear polymers thus formed contain repeat units of 5 membered pyrrolidinium rings. It is desirable to make linear base polymers with as high a molecular weight as the free radical polymerization process can provide if a high molecular weight lightly crosslinked final product is desired. Reaction conditions such as monomer concentration, initiator concentration, reaction temperature and reaction time all combine to affect the rate of radical polymerization and molecular weight of the obtained base polymer. Those skilled in the art, being aware of the principles of the present invention as disclosed herein, will be capable of selecting suitable reaction conditions to achieve high molecular weight. The post crosslinking technology disclosed in the present invention can then be used to raise the molecular weight to an even higher value. By the inventive process it is possible to obtain multi-crosslinked cationic polymer having a weight average molecular weight greater than 700,000 g/mole, for example a weight average molecular weight greater than 850,000 g/mole.

The cationic base polymer is chain extended or crosslinked by treating it with a suitable radical initiator in aqueous solution under agitation. A suitable radical initiator is a compound which can create radical sites on the cationic base polymer and help to overcome the positive electrostatic repulsion for combination of the cationic base polymeric radicals. Examples of suitable radical initiators are persulfate compounds such as potassium persulfate, sodium persulfate, ammonium persulfate, and the like. Other suitable radical initiators may include salts or derivatives of percarbonic acid (such as isopropyl percarbonate) and salts or derivatives of perphosphonic acid. The above-mentioned radical initiators may be used alone or in combination with various reducing agents to form redox initiator systems. Other polymerization initiators not mentioned above but known to people skilled in the art may also be used for the crosslinking reaction under suitable reaction conditions. The most preferred radical initiators for crosslinking the cationic base polymers are ammonium persulfate, sodium persulfate and potassium persulfate in view of the crosslinking efficiency, water solubility and the decomposition temperature.

The radical initiator is used in an amount ranging from about 0.02 to about 50%, preferably from about 0.5 to 10% and even more preferably from about 1 to 5% by weight based on the cationic base polymer. The chain-extending or crosslinking reaction can be carried out in aqueous medium or in the same reaction medium (e.g., water-in-oil emulsion) as used for preparing the base polymer. The crosslinking reaction can be carried out in aqueous medium at a pH from about 1 to about 12, preferably from 4 to 7, and at a temperature from about 20 to about 100° C., preferably from 70 to 100° C. without using reducing agents. The solids concentration of the base polymer in the reaction medium prior to the crosslinking reaction can be, by weight, from 1% to about 60%, preferably from 10% to 30% for a solution base polymer, and preferably from 20 to 50% for an emulsion or dispersion base polymer.

The required initiator may be added all together in the reactor at the reaction temperature to crosslink the base polymer. However, addition of a large amount of the initiator may cause undesirable formation of water-insoluble gels. For better control of the molecular weight or viscosity advancement, the initiator can be added in small increments or at a modest continuous rate. The reaction is allowed to proceed after each increment addition of the initiator (note: the increments can be made sufficiently small to be nearly a continuous addition) until the increase in the viscosity begins to level off. If the desired product viscosity has not yet been reached, another increment of initiator will be added. When the desired product viscosity is achieved, cooling to room temperature stops the reaction.

The preferred way to control the crosslinking reaction is by continuously feeding the initiator at a rate such that viscosity advancement of the reaction medium can be easily monitored. The efficiency of the initiator for crosslinking increases with decreasing feed rate of the initiator. Slow initiator feed rate gives high efficiency of the initiator for crosslinking and also provides easy control of viscosity or molecular weight advancement. The crosslinking reaction can be terminated once a desired viscosity or molecular weight is achieved by stopping the initiator feed and cooling the reaction. The effect of the initiator after stopping the initiator feed is small if a slow initiator feed rate is used. The initiator can be fed to the aqueous solution of the base polymer at a rate from 10% to 0.0005%, preferably from 0.2% to 0.001%, and the most preferably from 0.05% to 0.002% per minute by weight based on polymer solids. In this way multi-crosslinked cationic polymers having a weight average molecular weight greater than 700,000 g/mole, for example a weight average molecular weight greater than 850,000 g/mole, can be reproducibly obtained.

The exact mechanism of the crosslinking reaction is not specifically known. However, it is likely that free radicals are involved. In the case of using persulfate initiator, the crosslinking mechanism may be illustrated by the following scheme.

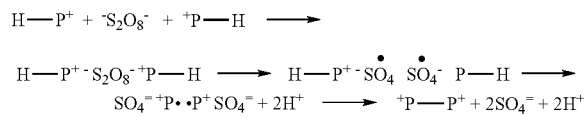

The persulfate dianion brings two cationic base polymer (H—P$^+$) units together through ionic bonding. The homolytic decomposition of the persulfate produces two anionic sulfate radicals that abstract hydrogen atoms from the base polymer chains to create two polymer radicals. Crosslinking is affected only when two polymer radicals combine. The polymer radicals formed, if not finding each other for crosslinking, may undergo degradation through chain transfer or disproportionational termination. The persulfate dianions help to bring together for crosslinking two cationic polymer radicals, which would otherwise have difficulty approaching each other because of the cationic charge repulsion. Thus, persulfate initiators have a high efficiency for crosslinking cationic polymers. Other initiators such as hydrogen peroxide can create cationic polymer radicals, which, however, because of the difficulty of overcoming electronic repulsion forces for crosslinking, tend to undergo degradation through chain transfer, or termination. Moreover, radical initiators such as hydrogen peroxide may have a much higher tendency than persulfate to induce chain transfer degradation. Residual double bonds on the cationic base polymer may also play a role in crosslinking. The present inventors do not intend to be limited to any crosslinking mechanism proposed.

In the above proposed crosslinking scheme, each persulfate molecule abstracts 2 hydrogen atoms to create two polymer radicals for crosslinking. The two abstracted hydrogen atoms are oxidized to two protons. Thus, the reaction pH will drift downward if no base is added to neutralize them. The decrease in pH is indeed observed with addition of persulfate initiator during the crosslinking reaction. The above-proposed mechanism is also supported by the experimental fact that a feed molar ratio of NaOH and ammonium persulfate of around 2.0 is optimal to achieve high crosslinking efficiency and keep reaction pH relatively constant.

In order to keep the crosslinking reaction at a desired pH during the course of the initiator feed, a base may be added to keep the pH from drifting downward. Examples of suitable bases that can be used alone or in combination for pH control include NaOH, KOH, NH$_4$OH, Na$_2$CO$_3$, and the like. The preferred base for the pH control is NaOH. The base can be added by continuous feeding with the initiator feed at a fixed ratio. The feed ratio of the base to the persulfate by moles can be from 0 to 8, preferably from 1 to 3, and the most preferably from 1.5 to 2.5. The base can also be added whenever the pH drops to below the desired value. As previously indicated, the crosslinking reaction can be carried out in aqueous medium at a pH of from about 1 to about 12. However it is preferably carried out in aqueous medium at a pH of from about 4 to 7.

The pH of the crosslinking reaction can also be controlled by using a pH controller. A base such as NaOH can be added to the reactor automatically through the pH controller whenever the reaction pH drifts down to a desired value.

Polymers of DADMAC can be crosslinked by persulfate compounds only when residual DADMAC monomer is reduced to sufficiently low levels. The maximum residual monomer level at which the crosslinking can occur depends on the polymer concentration used for the crosslinking reaction. Therefore, it is desirable that the cationic base polymer contains less than 10% of residual monomer, preferably less than 3%, and the most preferably less than 1% by weight of the base polymer solids. However, base polymers containing more than the desired amount of residual monomers can still be crosslinked by the methods disclosed in the present invention. In such cases, the radical initiator added in the crosslinking reaction is initially used for reduction of the residual monomer. Once the residual monomer is reduced to sufficiently low levels, the base polymer will begin crosslinking with the continuation of initiator addition.

The chain-extension or crosslinking reaction is preferably carried out under agitation. Adequate agitation can prevent formation of gel particles. Suitable agitation should not cause enough shear to result in significant polymer chain scission. In this way multicrosslinked cationic polymers having a weight average molecular weight greater than 700,000 g/mole, for example a weight average molecular weight greater than 850,000 g/mole, which are substantially free of gel particles can be obtained.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

The symbols below are used in the following examples:
APS=ammonium persulfate
BV=Brookfield viscosity, cps
DAA=diallylamine
GPC=gel permeation chromatography
HC=Huggins constant
IV=intrinsic viscosity (measured in 1M NaCl solution), dL/g at 30° C.
Mw=weight average molecular weight (by GPC using PEO standard), g/mole
Mn=number average molecular weight (by GPC using PEO standard), g/mole
NaPS=sodium persulfate
PS=polymer solids, wt %
RM=residual monomer (of DADMAC), wt %
MBS=sodium metabisulfite

EXAMPLES

Example 1

An Agefloc® WT2206*1800 20% aqueous solution of polyDADMAC, commercially available from Ciba Specialty Chemicals, is used as the cationic base polymer for chain extension in this example. The cationic base polymer has the properties shown in Table 1. The intrinsic viscosity and the Huggins constant are determined in 1M NaCl aqueous solution at 30° C. using standard procedures well known to one of ordinary skill in the art. The weight average molecular weight, Mw, and number average molecular weight, Mn, are determined by GPC. The Mw/Mn ratio or polydispersity index is an indication of molecular weight distribution, with high value indicating a broad distribution.

A 1-liter reactor fitted with a mechanical agitator, addition funnel and condenser is charged with 964.00 grams of the 20% aqueous solution of the base polymer. The reactor content is adjusted with NaOH solution to a pH of 6.9 and then heated to 100° C. with agitation and nitrogen purge. At 100° C., 18.2 g of 10% APS solution is fed to the reactor over 160 minutes and then another 19.0 g of 10% APS over 157 minutes. During the APS feeds, a 25% NaOH solution is co-fed to the reactor at a rate to give a NaOH/APS feed molar ratio of 2.0. Total APS used is 1.9% based on polymer solids. After the APS/NaOH co-feeds, the reactor content is held at 100° C. for 10 minutes and then cooled to room temperature. A product free from water-insoluble gel is obtained with the properties shown in Table 1.

TABLE 1

Properties of the cationic base polymer and its chain extended product in Example 1

| Properties at 25° C. | RM, % | PS % | pH | BV, cps | Mw × $10^{-3}$ | Mw/Mn | IV, dL/g | HC |
|---|---|---|---|---|---|---|---|---|
| Base polymer used | <0.1 | 20.6 | 5.4 | 3080 | 620 | 6.30 | 1.40 | 0.36 |
| chain extended product | <0.1 | 19.9 | 6.8 | 8040 | 966 | 10.2 | 1.86 | 0.53 |

Example 2

An Agefloc WT2206*1800 20% aqueous solution polyDADMAC, commercially available from Ciba Specialty Chemicals, is used as the cationic base polymer for chain extension. The cationic base polymer used has properties shown in Table 2.

A 1-liter reactor fitted with a mechanical agitator, addition funnel and condenser is charged with 964.00 grams of the 20% aqueous solution of the base polymer. The reactor content is heated to 100° C. with agitation and a nitrogen purge. At 100° C., 26.5 g of 10% APS solution is fed to the reactor over 170 minutes and then another 11.0 g of 10% APS over 90 minutes. During the APS feeds, the reaction pH is controlled at about 5.0 using a Chemcadet PH controller with a 25% NaOH solution. Total APS used is 1.9% based on polymer solids. After the APS feed, the reactor content is held at 100° C. for 20 minutes and then cooled to room temperature. A gel-free clear polymer solution product is obtained with the properties shown in Table 2.

TABLE 2

Properties of the cationic base polymer and its chain extended product in Example 2

| Properties at 25° C. | RM, % | PS % | pH | BV, cps | Mw × $10^{-3}$ | Mw/Mn | IV, dL/g | HC |
|---|---|---|---|---|---|---|---|---|
| Base polymer used | <0.1 | 20.6 | 5.4 | 3080 | 620 | 6.30 | 1.40 | 0.36 |
| chain extended product | <0.1 | 19.9 | 5.9 | 8550 | 929 | 10.9 | 1.83 | 0.42 |

Example 3

A 1-liter reactor equipped with a condenser, a thermometer, a nitrogen inlet, and an overhead agitator is charged with 307.69 g of 65% DADMAC monomer, 24.0 g of deionized water and 0.20 g of Versene ($Na_4EDTA$). The polymerization mixture is purged with nitrogen and heated with agitation to a temperature of 80° C. An aqueous solution containing 2.3 g of ammonium persulfate (APS) is slowly fed to the reactor over 375 minutes. The reaction temperature is allowed to increase to above 90° C. and then maintained at 90 to 100° C. during the APS feed period. After the APS feed, the reaction mixture is diluted with deionize water to about 38% solids and held at 90° C. for about 30 minutes. Then an aqueous solution containing 1.00 g of MBS is added over 10 minutes. The reactor is held at 90° C. for another 30 minutes to complete the polymerization (above 99% conversion). The polymer solution is diluted with sufficient water to about 20% solids. This product, to be used as the cationic base polymer for chain extension, has the properties shown in Table 3.

303 g of the above reactor content is heated to 90° C. Then, 30.7 g of a 20% NaPS solution is fed to the reactor over 27 minutes. During the NaPS feed, 5.41 g of 25% NaOH is added to maintain the reaction pH at about 5. The reactor contents are held at 94° C. with agitation for about 10 minutes. Then 100 g of deionized water is added to dilute the polymer solids to 13.9% and the reactor contents are cooled down to room temperature. A gel-free clear polymer solution product was obtained with the properties shown in Table 3.

TABLE 3

Properties of the cationic base polymer and its
chain extended product in Example 3

| Properties at 25° C. | RM, % | PS % | pH | BV, cps | Mw × 10⁻³ | Mw/Mn | IV, dL/g | HC |
|---|---|---|---|---|---|---|---|---|
| base polymer used | 0.2 | 20.3 | 1.8 | 4980 | 605 | 5.15 | 1.40 | 0.37 |
| Chain extended product | <0.1 | 13.9 | 6.0 | 1840 | 766 | 6.95 | 1.81 | 0.48 |

It should be understood that the above description and examples are illustrative of the invention, and are not intended to be limiting. Many variations and modifications are possible without departing from the scope of this invention.

What is claimed is:

1. A method for the preparation of an aqueous cationic polymer solution, said method comprising:
   (a) polymerizing substantially all of a monomer component having at least one monomer having a cationic functional group by reaction initiated from a free radical initiator to form a base cationic polymer solution;
   (b) contacting the base cationic polymer solution with additional free radical initiator to cause multiple cationic polymer groups to form interconnecting covalent bonds so that said base cationic polymer solution forms an aqueous solution containing covalently multi-crosslinked cationic polymer having a higher molecular weight than the base cationic polymer, wherein (b) takes place at the decomposition temperature of the initiator.

2. A method according to claim 1 wherein the cationic monomer is a diallyldialkylammonium monomer.

3. A method according to claim 1 wherein the additional free radical initiator used in step (b) is selected from the group consisting of potassium persulfate, sodium persulfate, ammonium persulfate, salts of percarbonic acid, salts of perphosphonic acid and mixtures thereof.

4. A method according to claim 1 wherein the additional free radical initiator used in step (b) consists essentially of an effective amount of ammonium persulfate.

5. A method according to claim 1 wherein the additional free radical initiator is added in incremental amounts over a defined period of time.

6. A method according to claim 1 wherein the base cationic polymer solution is diluted to a solids content of less than 30% prior to start of step (b).

7. A method according to claim 5 wherein the base cationic polymer solution is diluted to a solids content of less than 30% prior to start of step (b).

8. A method according to claim 6 wherein the multi-crosslinked cationic polymer has a weight average molecular weight greater than 700,000 g/mole.

9. A method according to claim 6 wherein the multi-crosslinked cationic polymer has a weight average molecular weight greater than 850,000 g/mole.

10. A method according to claim 2 wherein the diallyldialkyl ammonium monomer is represented by the formula:

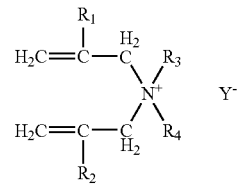

where $R_1$ and $R_2$ are independently of one another hydrogen or $C_1$–$C_4$ alkyl;

$R_3$ and $R_4$ are, independently of one another, hydrogen or an alkyl, hydroxyalkyl, carboxyalkyl, carboxyamidoalkyl, alkoxyalkyl group having from 1 to 18 carbon atoms; and $Y^-$ represents an anion.

11. A method according to claim 10 wherein the diallyldialkylammonium monomer is selected from the group consisting of diallyldimethylammonium chloride, diallyldimethylammonium bromide, diallyldimethylammonium sulfate, diallyldimethylammonium phosphate, dimethallyldimethylammonium chloride, diethylallyldimethylammonium chloride, diallyldi(beta-hydroxyethyl) ammonium chloride, diallyldi(beta-ethoxyethyl) ammonium chloride, diallyldiethylammonium chloride and mixtures thereof.

12. A method according to claim 10 wherein at least 50% by weight of the monomer, based on the weight of the entire monomer component available for polymerization, is diallyldimethylammonium chloride.

13. A method according to claim 12 wherein the monomer component further contains a copolymerizable monomer selected from the group consisting of acrylamide, methacrylamide, N,N-dimethylacrylamide, acrylic acid, methacrylic acid, vinylsulfonic acid, vinyl pyrrolidone, hydroxyethyl acrylate, styrene, methyl methacrylate, vinyl acetate and mixtures thereof.

14. A method for the preparation of an aqueous cationic polymer solution, said method comprising:
   (a) polymerizing substantially all of a monomer component having at least one monomer having a cationic functional group by reaction initiated from a free radical initiator to form a base cationic polymer solution;
   (b) contacting the base cationic polymer solution with additional free radical initiator to cause multiple cationic polymer groups to form interconnecting covalent bonds so that said base cationic polymer solution forms an aqueous solution containing covalently multi-crosslinked cationic polymer having a higher molecular weight than the base cationic polymer, wherein the free radical initiator concentration in (b) is 0.0005 to 10% by weight based on the cationic base polymer, and wherein (b) takes place at the decomposition temperature of the initiator.

15. A method according to claim 5 wherein the initiator is fed at a rate of from 0.2% to 0.001% per minute by weight based on polymer solids.

* * * * *